United States Patent Office 3,505,393
Patented Apr. 7, 1970

---

3,505,393
HOMOGONANE DERIVATIVES
Eugene E. Galantay, Morristown, N.J., assignor to Sandoz Inc., Hanover, N.J.
No Drawing. Continuation-in-part of applications Ser. No. 566,730, July 21, 1966, and Ser. No. 603,160, Dec. 20, 1966. This application Apr. 13, 1967, Ser. No. 630,496
Int. Cl. C07c 171/02
U.S. Cl. 260—479        17 Claims

ABSTRACT OF THE DISCLOSURE

13β-(lower alkyl)-B-(6)-homogonenes have been found to possess properties useful for fertility control and in the therapy of menopausal problems. They are also useful for growth stimulation, post-operative recovery and healing of wounds and burns.

---

This is a continuation-in-part of application Ser. No. 566,730 filed July 21, 1966, now abandoned, and of application Ser. No. 603,160 filed Dec. 20, 1966.

This invention relates to B-(6)-homogonane derivatives of the formula

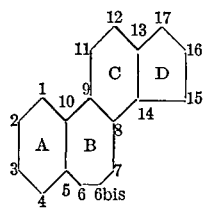

(I)

wherein any hydrogen atom bound to $C_9$, $C_{14}$, and/or $C_{17}$ is in the α-position; any hydrogen atom bound to $C_8$ and/or $C_{10}$ is in the β-position;

$R^1$ is bound to $C_{13}$ and is either β-methyl, β-ethyl, β-propyl or β-isopropyl;

$R^2$ is bound to $C_{17}$ and is either β-hydroxy, β-alkanoyloxy having from 2 to 20 carbon atoms, e.g. acetyloxy, caproyloxy and palmityloxy; or, together with $R^3$, oxo; and $R^3$ is bound to $C_{17}$ and is either α-hydrogen; α-(lower alkyl), e.g. α-methyl, α-ethyl, α-propyl, α-isopropyl and α-butyl; α-(lower alkenyl), e.g. α-methallyl, α-vinyl and α-allyl; α-(lower alkynyl), e.g. α-propargyl and α-ethynyl; α-chloroethynyl; α-fluoroethylnyl; or, together with $R^2$, oxo;

Ring A is one of the following:

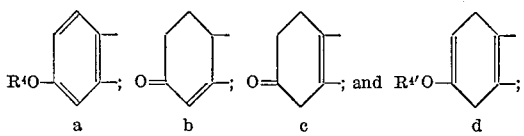

$R^4$ is either a hydrogen atom (—H), carboxylic acid acyl having from 2 to 4 carbon atoms, e.g. acetyl, propionyl and butyryl or $R^{4'}$;

$R^{4'}$ is lower alkyl, e.g. methyl, ethyl, propyl, isopropyl and butyl; or cycloalkyl having from 5 to 7 ring carbon atoms, e.g. cyclopentyl;

Ring B has at least one unsaturated carbon atom ($C_5$); and

Rings C and D are either saturated or unsaturated;

processes and intermediates employed in the preparation thereof and pharmaceutically acceptable compositions containing them.

The unsaturation in the remainder of the structure of compounds I is dependent to some extent on the saturation of the carbon atoms which form Ring A. Preferred compounds wherein Ring A is in form $a$ are those which are otherwise saturated, have $\Delta^8$ have $\Delta^{8(14)}$ or have $\Delta^{8,14}$; preferred compounds wherein Ring A is in form $b$ are those which are otherwise saturated, have $\Delta^9$ or have $\Delta^{8(14),9}$; and preferred compounds wherein Ring A is in either form $c$ or form $d$ are those which otherwise are saturated or have $\Delta^{8(14)}$.

The compounds of this invention are named from the parent steroid hydrocarbon

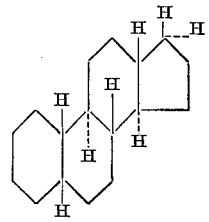

Gonane (or Sterane)

The individual rings of the depicted structure are designated, from left to right, A, B, C and D, as indicated in Formula I. In the structures of the compounds to which the present invention is directed there is an additional carbon atom in one of the rings; the compound is thus called a homogonane derivative. The fact that the additional carbon is in the B-ring makes it, more specifically, a B-homogonane. In order to specify that said additional carbon atom is interposed between $C_6$ and $C_7$ (as opposed to, e.g., between $C_9$ and $C_{10}$), the compounds are designated as B-(6)-homogonanes. In practice it is unnecessary to include the "(6)" in the name, but it is understood that all of the subject homosteroids are so restricted. Each of the homosteroids of this invention additionally has at least one double bond; it is therefore a B-(6)-homogon-(mono- or poly-)ene, hereinafter referred to generically as a B-(6)-homogonene.

Each compound I is unsubstituted in both the 5- and 10-position and is either an optically active isomer or a mixture of two such isomers, including racemates which consist of a levorotary and the corresponding dextrorotary form (enantiomers) in 1:1 proportion. Totally synthetic preparation of compounds I results in racemates which are separated into their enantiomers by resolution according to well-established procedures known to those skilled in the art. Usually only one of the optically active forms exerts useful biological activity, i.e. the form in which $C_{13}$ has the same absolute configuration as, e.g., in estrone or in other naturally-occurring steroids. It is thus advantageous to separate said form from its enantiomer to obtain a product having a greater activity.

Compounds I are useful in the treatment of female hypogonanadism, endometriosis, amenorrhea, dysmenorrhea, functional uterine bleeding, acne, osteoporosis, infertility and habitual abortion. They are also useful in achieving ovulation block, pregnancy maintenance, nitrogen retention, growth stimulation, post-operative recovery, healing wounds and burns lipid shifting and lowering of the blood cholesterol level. They are particularly useful for fertility control and the therapy of menopausal problems. They are also intermediates for preparing compounds with the indicated utilities.

Compounds I are administered to mammals daily (or in long-acting preparations) in standard dosage forms, e.g. in tablets or capsules perorally or in oily solutions, emulsions or suspensions subcutaneously or intramuscularly.

Daily doses range from 0.001 to 1.2 mg./kg. of body weight, e.g. 0.05 to 80 milligrams.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compound is:

| | Parts |
|---|---|
| Title compound of Example 15 | .25 |
| Tragacanth | 2 |
| Lactose | 89.25 |
| Corn starch | 5 |
| Talcum | 3 |
| Magnesium stearate | 0.5 |
| Alcohol SD-30 } | q.s. |
| Purified water } | |

Among the compounds of the present invention, 3-methoxy - 13(lower alkyl)-B-homogona-1,3,5(10),8,14-pentaen-17-ones V are prepared according to

SCHEME A

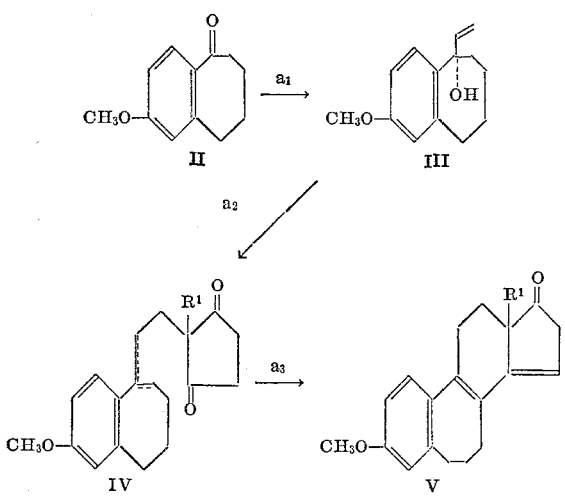

2-methoxy-6,7,8,9-tetrahydro - 5H - benzocyclohepten-5-one [J. Chem. Soc., 990 (1966)] II is reacted with a vinylmagnesium halide to yield 2-methoxy-5-vinyl-6,7,8,9-tetrahydro-5H-benzocyclohepten-5-ol III. (Other 2-loweralkoxy counterparts are obtained from corresponding starting materials.) III is subsequently reacted with a 2-(lower alkyl)-cyclopenta-1,3-dione [Bull. Soc. Chim. France, 1036 (1955)] in moderately acid (acetic acid-xylene) or basic (triethylenediamine-xylene) media under reflux; thus-prepared 3-methoxy-8,14-seco-13-(lower alkyl)-B-homogona-1,3,5(10),8 [and/or 9(11)]-tetraene-14,17-dione IV is cyclized with acid, e.g. p-toluenesulfonic acid in boiling benzene and hydrochloric acid in methanol, at from 20° to 60°, or polyphosphoric acid, to obtain compounds V.

Other compounds of this invention can be prepared from V, by the following modifications or combinations thereof:

| | Scheme |
|---|---|
| Reduction or alkylation of the 17-oxo group | B |
| Reduction or hydrogenation of the double bonds in rings B, C, D | C |
| Demethylation of the 3-methoxy group, followed, if desired, by realkylation or acylation | D |
| Reduction of the aromatic ring A by the so-called Birch method, followed by hydrolysis of the thus-formed enol ether | E |
| Introduction of a $\Delta^9$ double bond in products obtained according to Scheme E, by bromination-dehydrobromination (or other dehydrogenation methods) | F |

SCHEME B

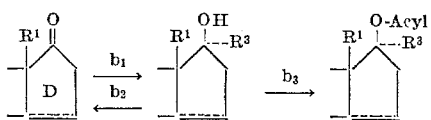

Step $b_1$ is reduction (by sodium borohydride or lithium aluminum hydride) when $R^3$=H; it is a reaction with $R^3$-MgCl, $R^3$-MgBr, $R^3$-Li, $R^3$-Na or $R^3$-K when $R^3$ is other than H.

Step $b_2$ is the reversal of step $b_1$ and is effected, in cases where $R^3$=H, by oxidation methods employing chromicsulfuric acid in acetone (Jones method), chromic acid in pyridine or aluminum-isopropoxide-cyclohexanone (Oppenauer method).

Step $b_3$ is acylation of the 17β-hydroxy group.

SCHEME C

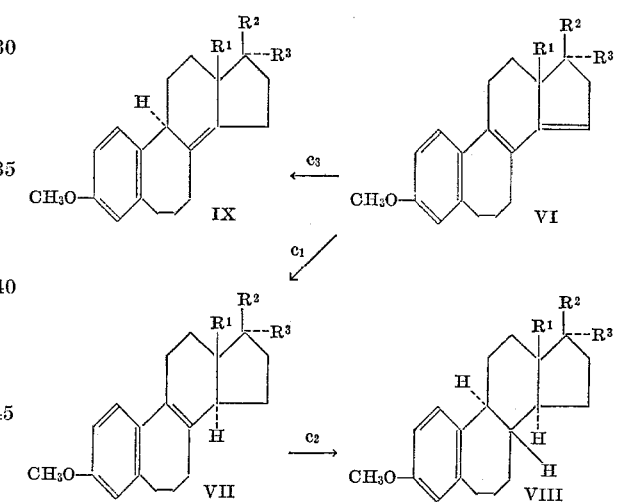

Step $c_1$ is catalytic reduction, preferably using a palladium/calcium carbonate or Raney nickel catalyst, in dioxane or benzene solvent.

Steps $c_2$ and $c_3$ are reductions with lithium sodium or potassium in liquid ammonia in the presence of aniline or pyrrole as a proton source.

For carrying out steps $c_1$ to $c_3$, it is preferred to select compounds VI and VII with $R^2$ and $R^3$ substituents which would, themselves, not be changed under the conditions employed in said steps.

SCHEME D

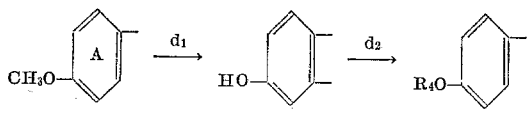

Step $d_1$ is demethylation effected by, e.g., molten pyridine hydrochloride, boron tribromide or hydrogen bromide.

Step $d_2$ is alkylation, cycloalkylation or acylation.

Again, it is preferred to select, for steps $d_1$ and $d_2$, compounds of the present invention which, under the conditions employed in those steps, would not undergo changes additional to those occurring at the $R^4O$-groups.

SCHEME E

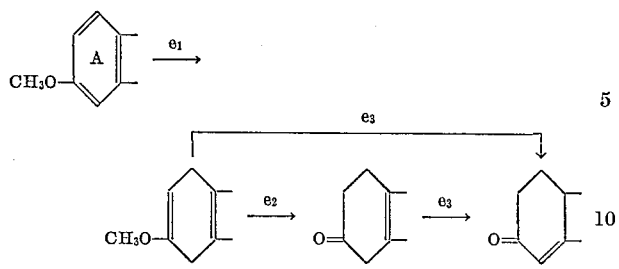

Step $e_1$ is the so-called Birch reduction; preferred is the use of Li, Na or K in liquid ammonia-tetrahydrofuran mixture with a lower aliphatic alcohol, e.g. tert.-butyl alcohol or ethanol, as a proton source.

Step $e_2$ is a mild hydrolysis, effected, preferably, with oxalic or acetic acid.

Step $e_3$ is a more vigorous hydrolysis or rearrangement, efftcted, preferably, with hydrochloric acid.

Again it is preferred to select compounds, which would not undergo changes other than in the A-ring.

SCHEME F

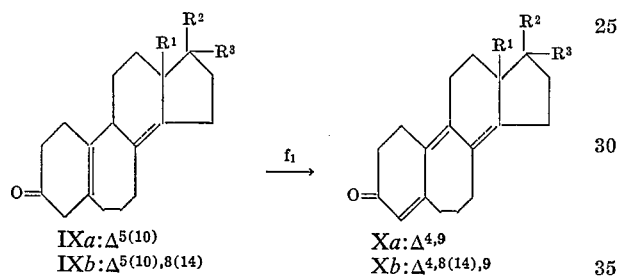

IX$a$:$\Delta^{5(10)}$  X$a$:$\Delta^{4,9}$
IX$b$:$\Delta^{5(10),8(14)}$  X$b$:$\Delta^{4,8(14),9}$ Step $f_1$ is the reaction of IX with pyridinium bromide-perbromide followed by dehydro-bromination, e.g., with pyridine.

These procedures and others (the individual reactions for which are known to the art-skilled) lead (from corresponding available starting materials) to each of the following compounds I:

B-homogona-
    1,3,5(10)-trien-17β-ol
    3-cyclopentyloxy-13β-ethyl-17α-propyl
    3-acetoxy-13β-isopropyl
    17α-butenyl-3-decanoyloxy-13β-ethyl
    3-methoxy-13β-methyl
    13β,17α-dimethyl-3-propionyloxy
    13β-ethyl-3-hydroxy
    3-hydroxy-13β-isopropyl
    3-hydroxy-17α-methallyl-13β-methyl
    3-acetyloxy-13β-propyl-17α-propargyl
    17α-isopropyl-3-methoxy-13β-methyl
    3-cyclohexyloxy-13β,17α-dimethyl
    13β-ethyl-17α-ethynyl-3-propoxy
    17α-chlorethynyl-3-isopropoxy-13β-methyl
    3-cyclopentyloxy-13β-ethyl-17α-fluorethynyl B-homogona-
    1,3,5(10)-trien-17-one
    3-methoxy-13β-methyl
    13β-ethyl-3-hydroxy
    3-acetoxy-13β-isopropyl
    3-cyclopentyloxy-13β-ethyl
    3-cyclohexyloxy-13β-methyl
    3-butoxy-13β-propyl
    3-acetoxy-13β-methyl
    3-hydroxy-13β-isopropyl
    3-cyclopentyloxy-13β-methyl
    3-acetoxy-13β-ethyl
    13β-propyl-3-methoxy
    13β-methyl-3-propionyloxy
    3-ethoxy-13β-ethyl
    3-cyclohexyloxy-13β-isopropyl
    13β-methyl-3-propoxy
    3-butyryloxy-13β-ethyl
    3-isopropoxy-13β-propyl
    3-cycloheptyloxy-13β-methyl
    3-butoxy-13β-ethyl
    3-acetoxy-13β-methyl B-homogona-
    1,3,5(10)-triene-3,17β-diol
    13β-ethyl-17α-propyl
    17α-butyl-13$b$-ethyl
    17α-(2-butyn-1-yl)-13β-ethyl
    13α-allyl-13β-ethyl
    17α-allyl-13$b$-methyl
    13β-ethyl-17α-propargyl
    13β-ethyl-17α-methallyl
    17α-(2-buten-1-yl)-13β-ethyl
    13β-methyl-17α-propyl
    17α-butyl-13β-methyl
    17α-(2-butyn-1-yl)-13β-methyl
    13β-methyl-17α-propargyl
    17α-methallyl-13β-methyl
    17α-(2-buten-1-yl)-13β-methyl B-homogona-
    1,3,5(10),8(14)-tetraene-3,17β-diol
    13β-ethyl-17α-propyl
    17α-butyl-13β-ethyl
    17α-(2-butyn-1-yl)-13β-ethyl
    17α-allyl-13β-ethyl
    17α-allyl-13β-methyl
    13β-ethyl-17α-propargyl
    13β-ethyl-17α-methallyl
    17α-(2-buten-1-yl)-13β-ethyl
    13β-methyl-17α-propyl
    17α-butyl-13β-methyl
    17α-(2-butyn-1-yl)-13β-methyl
    13β-methyl-17α-propargyl
    17α-methallyl-13β-methyl
    17α-(2-buten-1-yl)-13β-methyl 3-acetoxy-B-homogona-
    1,3,5(10)-trien-17β-ol
    13β-ethyl-17α-propyl
    17α-butyl-13β-ethyl
    17α-(2-butyn-1-yl)-13β-ethyl
    13α-allyl-13β-ethyl
    17α-allyl-13β-methyl
    13β-ethyl-17α-propargyl
    13β-ethyl-17α-methallyl
    17α-(2-buten-1-yl)-13β-ethyl
    13β-methyl-17α-propyl
    17α-butyl-13β-methyl
    17α-(2-butyn-1-yl)-13β-methyl
    13β-methyl-17α-propargyl
    17α-methallyl-13β-methyl
    17α-(2-buten-1-yl)-13β-methyl 3-acetoxy-B-homogona-
    1,3,5(10),8(14)-tetraene-17β-ol
    13β-ethyl-17α-propyl
    17α-butyl-13β-ethyl
    17α-(2-butyn-1-yl)-13β-ethyl
    13α-allyl-13β-ethyl
    17α-allyl-13β-methyl
    13β-ethyl-17α-propargyl
    13β-ethyl-17α-methallyl
    17α-(2-buten-1-yl)-13β-ethyl
    13β-methyl-17α-propyl
    17α-butyl-13β-methyl
    17α-(2-butyn-1-yl)-13β-methyl
    13β-methyl-17α-propargyl
    17α-methallyl-13β-methyl
    17α-(2-buten-1-yl)-13β-methyl B-homogona-
    1,3,5(10)-triene
    3-butoxy-17β-eicosyloxy-13β-ethyl-17α-methallyl B-homogona-
  1,3,5(10)-trien-3-ol
    17α-ethynyl-17β-hexanoyloxy-13β-methyl
    17β-acetyloxy-17α-butyl-13β-methyl
    13β-ethyl-17α-propargyl-17β-propionyloxy
    17β-acetyloxy-13β,17α-diisopropyl
    13β-methyl-17β-propionoxy
    17β-acetoxy-13β-ethyl-17α-vinyl
    13β-propyl-17α-methyl-17β-propionoxy
    17β-acetoxy-13β-propyl-17α-methyl
    17α-ethynyl-13β-methyl-17β-propionoxy
    17β-acetoxy-13β,17α-diethyl
    17α-chlorethynyl-13β-isopropyl-17β-propionoxy
    17β-acetoxy-13β-methyl-17α-propyl
    17α-allyl-17β-caproyloxy-13β-propyl
    17α-fluorethynyl-13β-methyl-17β-propionoxy
    17β-acetoxy-13β-ethyl-17α-methallyl B-homogona-
  1,3,5(10),8-tetraen-17β-ol
    17α-ethynyl-3-methoxy-13β-methyl
    3-methoxy-13β-methyl
    17α-butynyl-3-hydroxy-13β-methyl
    17α-butyl-13β-ethyl-3-hydroxy
    3-cyclopentyloxy-13β-ispropyl-17α-propargyl
    3-acetoxy-17α-isopropyl-13β-methyl
    13β-ethyl-3-methoxy
    13β-propyl-3-propionoxy-17α-vinyl
    3-ethoxy-13β,17α-dimethyl
    3-cyclohexyloxy-13β-ethyl-17α-ethynyl
    17α-ethyl-13β-isopropyl-3-propoxy
    3-butyroxy-17α-chlorethynyl-13β-methyl
    13β-ethyl-3-isopropoxy-17α-propyl
    3-cycloheptyloxy-13β-propyl
    17α-allyl-3-butoxy-13β-methyl
    3-acetoxy-13β-ethyl-17α-fluorethynyl
    3-cyclopentyloxy-17α-methallyl-13β-methyl B-homogona-
  1,3,5(10),8-tetraen-17-one
    3-methoxy-13β-methyl
    13β-ethyl-3-hydroxy
    3-butyryloxy-13β-isopropyl
    3-cyclopentyloxy-13β-ispropyl
    13β-ethyl-3-propionyloxy
    3-cyclopentyloxy-13β-methyl
    3-acetoxy-13β-ethyl
    13β-isopropyl-3-methoxy
    13β-methyl-3-propionoxy
    3-ethoxy-13β-ethyl
    3-cyclohexyloxy-13β-propyl
    13β-methyl-3-propoxy
    3-butyroxy-13β-ethyl
    3-isopropoxy-13β-isopropyl
    3-cycloheptyloxy-13β-methyl
    3-butoxy-13β-ethyl
    3-acetoxy-13β-propyl
    3-cyclopentyloxy-13β-methyl
    13β-ethyl-3-hydroxy B-homogona-
  1,3,5(10),8-tetraene
    3,17β-diacetoxy-13β,17α-diethyl
    3,17β-diacetoxy-17α-butyl-13β-methyl
    3-cyclopentyloxy-13β-ethyl-17α-propargyl-17β-propionoxy
    3-acetoxy-17β-butyroxy-13β,17α-diisopropyl
    17β-acetoxy-3-methoxy-13β-methyl
    13β-ethyl-3,17β-dipropionoxy-17α-vinyl
    17β-acetoxy-3-ethoxy-13β-propyl-17α-methyl
    3-cyclohexyloxy-17α-ethynyl-13β-methyl-17β-propionoxy
    17β-butyroxy-13β,17α-diethyl-3-propoxy
    17β-acetoxy-3-butyroxy-17α-chlorethynyl-13β-isopropyl
    3-isopropoxy-13β-methyl-17β-propionoxy-17α-propyl
    17β-acetoxy-3-cycloheptyloxy-13β-ethyl
    17α-allyl-3-butoxy-17β-caproyloxy-13β-propyl
    3-acetoxy-17α-fluorethynyl-13β-methyl17β-propionoxy
    17β-acetoxy-3-cyclopentyloxy-13β-ethyl-17α-methallyl B-homogona-
  1,3,5(10),8,14-pentaen-17β-ol
    3-methoxy-13β-methyl
    13β-isopropyl-3-methoxy
    17α-ethynyl-13β-methyl-3-methoxy
    13β-ethyl-3-hydroxy-17α-propargyl
    3-cyclopentyloxy-13β,17α-diisopropyl
    3-acetoxy-13β-methyl
    13β-ethyl-3-methoxy-17α-vinyl
    17α-methyl-3-propionoxy-13β-propyl
    3-ethoxy-17α-ethynyl-13β-methyl
    3-cyclohexyloxy-13β,17α-diethyl
    17α-chlorethynyl-13β-isopropyl-3-propoxy
    3-butyroxy-13β-methyl-17α-propyl
    13β-ethyl-3-isopropoxy
    17α-allyl-3-cycloheptyloxy-13β-propyl
    3-butoxy-17α-fluorethynyl-13β-methyl
    3-acetoxy-13β-ethyl-17α-ethynyl
    17α-butyl-3-cyclopentyloxy-13β-ethyl B-homogona-
  1,3,5(10),8,14-pentaen-17-one
    13β-ethyl-3-methoxy
    3-hydroxy-13β-methyl
    3-hydroxy-13β-isopropyl
    3-cyclopentyloxy-13β-propyl
    3-acetoxy-13β-ethyl
    3-methoxy-13β-methyl
    3-propionoxy-13β-propyl
    3-ethoxy-13β-methyl
    3-cyclohexyloxy-13β-ethyl
    13β-isopropyl-3-propoxy
    3-butyroxy-13β-ethyl
    3-isopropoxy-13β-propyl
    3-cycloheptyloxy-13β-isopropyl
    3-butoxy-13β-methyl
    3-acetoxy-13β-propyl
    3-cyclopentyloxy-13β-methyl B-homogona-
  1,3,5(10),8(14)-tetraen-17β-ol
    3-methoxy-13β-methyl
    13β-ethyl-3-methoxy-17α-propynyl
    13β-ethyl-3-methoxy
    17α-allyl-3-methoxy-13β-methyl
    17α-butynyl-3-methoxy-13β-methyl
    3-cyclopentyloxy-13β-isopropyl B-homogona-
  1,3,5(10),8(14)-tetraen-17-one
    3-methoxy-13β-methyl
    13β-ethyl-3-methoxy
    3-cyclohexyloxy-13β-isopropyl
    3-acetoxy-13β-methyl B-homogona-
  1,3,5(10),8(14)-tetraene
    13β-isopropyl-3-methoxy-17β-propionyloxy-17α-propyl
    13β-ethyl-3-isopropoxy-17β-valeryloxy-17α-vinyl
    3-cyclohexyloxy-17α-methallyl-13β-methyl-17β butyryloxy B-homogona-
  2,5(10)-dien-17β-ol
    3-methoxy-13β-methyl
    17α-ethynyl-3-methoxy-13β-methyl
    17α-ethyl-3-methoxy-13β-methyl
    13β,17α-diethyl-3-methoxy B-homogona-
    2,5(10)-dien-17-one
    3-cycloheptyloxy-13β-methyl
    3-butoxy-13β-ethyl
    3-cyclopentyloxy-13β-isopropyl
    3-ethoxy-13β-methyl B-homogona-
    2,5(10)-diene
    17β-heptanoyloxy-13β-methyl-3-propoxy
    17α-allyl-3-cycloheptyloxy-13β-ethyl-17β-tetradecanoyloxy
    17α-chlorethynyl-3-cyclohexyloxy-17β-hexadecanoyloxy-13β-methyl
    3-cyclopentyloxy-13β-ethyl-17β-heptadecanoyloxy-17α-methyl
    3-butoxy-17α-chlorethynyl-13β-ethyl-17β-octanoyloxy
    13β-isopropyl-17α-fluorethynyl-17β-nonanoyloxy-3-ethoxy B-homogona-
    2,5(10),8(14)-trien-17β-ol
    3-methoxy-13β-methyl
    13β-ethyl-3-methoxy
    13β,17α-diethyl-3-methoxy
    17α-ethynyl-3-methoxy-13β-methyl
    17α-chlorethynyl-13β-ethyl-3-methoxy B-homogona-
    2,5(10),8(14)-trien-17-one
    13β-isopropyl-3-methoxy
    3-methoxy-13β-methyl 17β-hydroxy-B-homogon-
    4-en-3-one
    13β-methyl
    13β,17α-diethyl B-homogon-
    4-ene-3,17-dione
    13β-methyl
    13β-ethyl
    13β-isopropyl
    13β-propyl B-homogon-
    4-en-3-one
    17α-allyl-17β-decanoyloxy-13β-methyl
    17α-fluorethynyl-13β-isopropyl-17β-pentadecanoyloxy 17β-hydroxy-B-homogona-
    4,8(14)-dien-3-one
    13β-methyl
    13β-ethyl-17α-ethynyl
    13β-ethyl-17α-propyl B-homogona-
    4,8(14)-diene-3,17-dione
    13β-methyl
    13β-ethyl
    13β-propyl
    13β-isopropyl 17β-hydroxy-B-homogona-
    4,8(14),9-trien-3-one
    13β-methyl
    13β-ethyl-17α-ethynyl
    13β-ethyl-17α-propynyl
    17α-ethyl-13β-methyl
    17α-fluorethynyl-13β-methyl
    13β-isopropyl B-homogona-
    4,8(14),9-triene-3,17-dione
    13β-methyl
    13β-ethyl
    13β-isopropyl
    13β-propyl B-homogona-
    4,8(14),9-trien-3-one
    17α-butyl-17β-dodecanoyloxy-13β-isopropyl
    17α-ethynyl-13β-isopropyl-17β-octadecanoyloxy 17β-hydroxy-B-homogona-
    4,9-dien-3-one
    13β-methyl
    13β-ethyl B-homogona-
    4,9-diene-3,17-dione
    13β-ethyl
    13β-isopropyl B-homogona-
    4,9-dien-3-one
    13β-ethyl-17α-isopropyl-17β-undecanoyloxy
    13β-methyl-17β-nonadecanoyloxy-17α-vinyl 17b-hydroxy-B-homogon-
    5(10)-en-3-one
    13β-methyl
    13β-ethyl
    17α-ethynyl-13β-methyl
    17α-chlorethynyl-13β-isopropyl B-homogon-
    5(10)-ene-3,17-dione
    13β-ethyl
    13β-methyl
    13β-isopropyl B-homogon-
    5(10)-en-3-one
    17α-isopropyl-13β-methyl-17β-tridecanoyloxy 17β-hydroxy-B-homogona-
    5(10),8(14)-dien-3-one
    13β-methyl
    13β-ethyl-17α-ethynyl
    17α-fluorethynyl-13β-isopropyl
    13β-methyl-17α-vinyl B-homogona-
    5(10),8(14)-diene-3,17-dione
    13β-methyl
    13β-ethyl
    13β-propyl
    13β-isopropyl All compounds within the scope of this invention are prepared from available, i.e. compounds which are either known per se or are prepared from known compounds by analogy procedures within the skill of the art, starting materials and/or intermediates.

The examples which follow are merely illustrative of the invention, all temperatures being in degrees centigrade, the parts and percentages being by weight unless otherwise specified and the relationship between parts by weight and parts by volume being the same as that between the kilogram and the liter.

Unless stated otherwise, reaction mixtures obtained as specified in the examples are worked up in the following manner: the mixture obtained from the chemical reaction is distributed between water and a solvent, e.g. benzene, ethyl acetate and chloroform, which is not miscible with water. (If solvents miscible with water are used in the reaction, they can be partially or totally removed by vacuum evaporation from the reaction mixture prior to distribution.) The aqueous phase is then separated and further extracted with the specified solvent until practically all of the desired organic product is collected in the solvent. The unified organic solution is then washed with water or aqueous solutions, e.g. (aq) sodium hydrocarbonate and dilute (aq) hydrochloric acid, to remove, if feasible, side products. After drying over an anhydrous salt, e.g. sodium sulfate, the solution is evaporated in vacuo to give the crude product as a residue, which is purified by crystallization, recrystallization, chromatography or high-vacuum distillation. All of these are well-known operations to the skilled in the art.

EXAMPLE 1

2-methoxy-5-vinyl-6,7,8,9-tetrahydro-5H-benzocyclohepten-5-ol

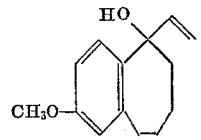

Prepare vinyl magnesium bromide from 6.7 parts of magnesium turnings and 37.0 parts of vinyl bromide in 150 parts by volume of tetrahydrofuran (THF). Add (over a period of 30 minutes and at 30°) to the resultant vinyl magnesium bromide a solution of 14.7 parts of 2-methoxy-6,7,8,9-tetrahydro - 5H - benzocyclohepten-5-one in 150 parts by volume of THF. Maintain the resulting mixture at room temperature (20°) for 16 hours. After cooling to 5°, add dropwise thereto 75 parts by volume of a saturated aqueous ammonium chloride solution and work up the thus-produced organic layer with ethyl acetate. The title compound is thus obtained as an oil.

EXAMPLE 2

(a) 3-methoxy-13-methyl-8,14-seco-B-homogona-1,3,5(10),9(11)-tetraene-14,17-dione

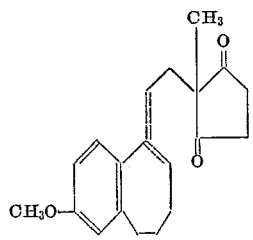

Add (over a period of 3½ hours) a solution of 21.8 parts of 2-methoxy-5-vinyl-6,7,8,9-tetrahydro-5H-benzocyclohepten-5-ol in 150 parts by volume of xylene to a mixture of 9.6 parts of 2-methylcyclopentane-1,3-dione, 0.75 part of triethylene diamine and 450 parts by volume of xylene refluxing under a Dean-Stark water trap. After refluxing for an additional six hours, cool the mixture to room temperature, wash same with 5% (aq) potassium hydroxide solution, then wash with water, dry over sodium sulphate and evaporate to a dark viscous oil; obtain the pure title compound by chromatography over silica gel.

(b) 3-methoxy-13β-methyl-B-homogona-1,3,5(10),8,14-pentaen-17-one

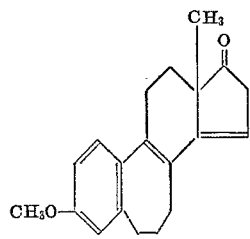

Reflux under a Dean-Stark trap a solution of 3.48 parts of (a) and 0.2 part of p-toluenesulfonic acid in 25 parts by volume of benzene until the calculated volume of water has collected. Wash the reaction mixture with 2 N sodium carbonate and then with water. Dry the thus-washed mixture over magnesium sulfate, filter said mixture and evaporate the filtrate. Triturate the resulting residue with diethyl ether to obtain the title compound, melting point (M.P.) 149° to 152°, after recrystalliaztion from ethanol.

(c) 3-methoxy-13β-methyl-B-homogona-1,3,5(10),8-tetraen-17-one

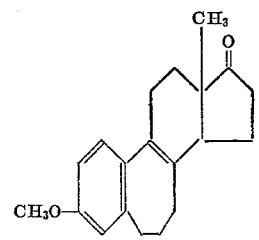

Catalytically hydrogenate 3-methoxy-13β-methyl-B-homogona-1,3,5(10),8,14-pentaen-17-one under the conditions described in Example 3(b) to obtain the title compound as an oil; the oxime, prepared in the usual way, has a M.P. of 183°, dec.

EXAMPLE 3

(a) 3-methoxy-13β-methyl-B-homogona-1,3,5(10),8,14-pentaen-17β-ol

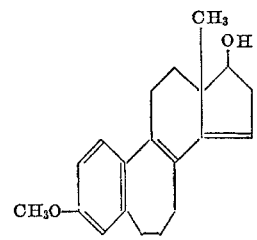

Cool to −30° a suspension of 2.06 parts of 2(b) in 140 parts by volume of methanol. Add to the suspension (with stirring) 0.3 part of sodium borohydride. Continue stirring for 4 hours while maintaining the same temperature. Add acetic acid and water to the reaction mixture, filter and wash with water and then dry at room temperature to separate crystalline title compound (decomposition at 54°). (To characterize, prepare the 17β-acetate with acetic anhydride in pyridine; M.P. 139° to 142°.)

(b) 3-methoxy-13β-methyl-B-homogona-1,3,5(10),8-tetraen-17β-ol

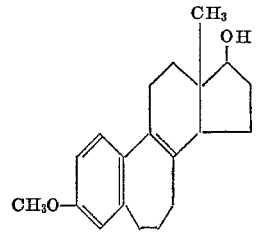

Add 0.5 part of 3(a) to 0.15 part of palladized calcium carbonate prehydrogenated under 10 parts by volume of dioxane. Stir under an atmosphere of hydrogen and at room temperature until one mole of hydrogen is consumed. Filter off the catalyst and evaporate the filtrate to dryness. Triturate the residue in petroleum ether to obtain the title compound M.P. 108° to 111°; acetate M.P. 103° to 106°.

(c) 3-methoxy-13β-methyl-B-homogona-1,3,5(10)-trien-17β-ol

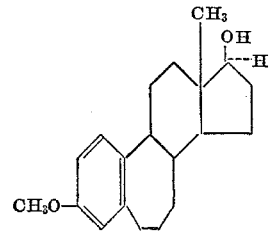

Add portionwise (with stirring) 2.2 parts of sodium to 2.2 parts of 3(b) in 150 parts by volume of liquid ammonia, 40 parts by volume of THF and 15 parts by volume of aniline.

After stirring for twenty minutes add ammonium chloride, diethyl ether and water to the resultant. Separate and dry the ethereal layer and then evaporate same to obtain the title compound; acetate M.P. 117° to 120°.

(d) 3-methoxy-13β-methyl-B-homogona-1,3,5(10)-trien-17-one

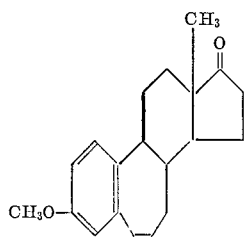

Add to the stirred mixture of 3 parts of 3(c) and 6 parts of anhydrous magnesium sulfate in 150 parts by volume of acetone, 3.6 parts by volume of "Jones Reagent" (8 N chromic acid-sulfuric acid solution). After 2 minutes at room temperature, add thereto 9 parts by volume of isopropyl alcohol and 6 parts of sodium hydrocarbonate. Evaporate the mixture and distribute the residue between diethylether and water. Evaporate the dried ethereal layer to obtain the title product, M.P. 78° to 82°.

(e) 13β-methyl-B-homogona-1,3,5(10),8-tetraene-3,17β-diol

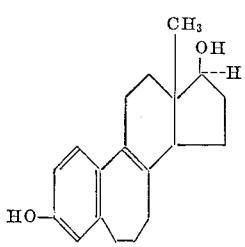

To a clear solution of 14.5 parts of 3(b) in 1000 parts by volume of liquid ammonia, 700 parts by volume of dry THF and 300 parts by volume of aniline, add 4.0 parts of lithium metal. After six hours add 35 parts of ammonium chloride to the resultant; then add thereto 500 parts by volume of water. Allow the ammonia to evaporate. Then acidify the resulting mixture to pH 1 by the addition thereto of 400 parts by volume of concentrated hydrochloric acid. Isolate the steroidal material (14.5 parts of yellow foam) by extraction with diethylether. Crystallize the title compounds, M.P. (184°)–186° to 188.5°, from the ether extract with 100 parts by volume of benzene. [The diacetate, M.P. 135° to 138°, is prepared in the standard way.]

Evaporate to dryness the benzene mother liquor and redissolve the obtained residue in 50 parts by volume of 95% ethanol. On maintaining the resultant at 6°, 3(c), M.P. 79° to 109°, precipitates. [The acetate of 3(c), M.P. 117° to 120°, is prepared in the standard way.]

(f) 3-hydroxy-13β-methyl-B-homogona-1,3,5(10),8-tetraen-17-one

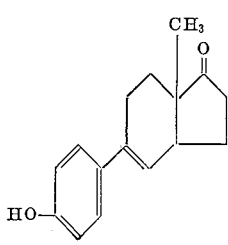

Reflux in a nitrogen atmosphere for two hours a mixture of 2.015 parts of 3(e), 4.35 parts of aluminum isopropoxide, 72 parts by volume of benzene and 29 parts by volume of 2-butanone. Pour the thus-refluxed mixture on ice, and then acidify same to pH 2 with 6 N hydrochloric acid before extracting same with benzene to obtain 2.01 parts of foamy material. Crystallize said foamy material from 25 parts by volume of boiling methanol to obtain the title compound, M.P. (after an additional recrystallization from ethyl acetate) 203° to 212° (dec.).

(g) 17α-(2-butyn-1-yl)-13β-methyl-B-homogona-1,3,5-(10),8-tetraene-3,17β-diol

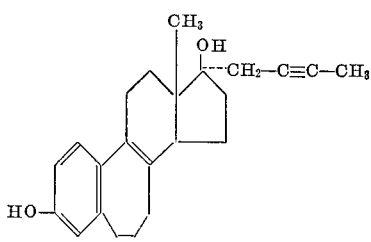

Following the procedure of Example 4(b), but replacing compound 4(a) with an equivalent of compound 3(f), results in the preparation, in similar manner, of the title compound, M.P. 193° to 197°.

(h) 17α-methallyl-13β-methyl-B-homogona-1,3,5(10),8-tetraene-3,17β-diol

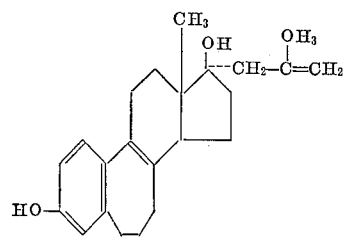

Following the procedure of Example 4(b), but replacing compound 4(a) with an equivalent of compound 3(f) and replacing the butynyl bromide with an equivalent of methallyl chloride, results in the preparation, in similar manner, of the title compound, M.P. (182°)–184° to 187°.

EXAMPLE 4

(a) 3-hydroxy-13β-methyl-B-homogona-1,3,5(10)-trien-17-one

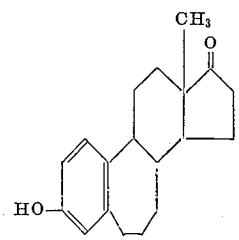

Maintain a melt of 0.30 part of 3(d) and 2.2 parts of pyridine hydrochloride at 210° for 40 minutes. After cooling the resulting melt to room temperature, add water and diethylether thereto. Wash the ethereal layer several times with 2 N hydrochloric acid and water; dry same and evaporate to obtain the title compound.

(b) 17α-(2-butyn-1-yl)-13β-methyl-B-homogona-1,3,5-(10)-triene-3,17β-diol

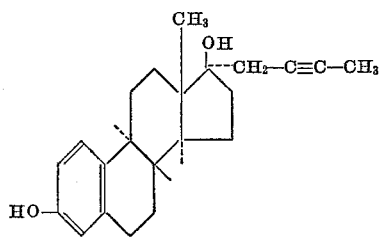

Mix a solution of 0.970 part of 4(a) in 20 parts by volume of benzene with a solution of 0.015 part of p-toluenesulfonic acid in 8 parts by volume of benzene (both azeotropically dried). Admix 3.0 parts by volume of dihydropyran with the resultant. After 18 hours at 25°, pass the resulting admixture through a column of 20.0 parts of Merck reagent alumina, and subsequently wash the column with about 200 parts by volume of benzene. Evaporate the benzene eluates to obtain the 3-tetrahydropyranylether, M.P. (100°)–103° to 116°, of 4(a).

To a refluxing Grignard mixture (prepared, in the usual manner, from 0.665 part of magnesium turnings and 3.2 parts of butynyl bromide under 10 parts by volume of diethylether) add a solution of said 3-tetrahydropyranylether of 4(a) in 10 parts by volume of THF. After ten minutes of reflux, cool the refluxed material to 5° and then decompose same by slowly adding thereto 5.0 parts by volume of saturated (aq) ammonium chloride solution. Thereafter add to the resultant 1.0 part of anhydrous sodium sulfate. Filter off the solids, wash same with THF, combine the filtrate and washings and evaporate the obtained combination to dryness. Dissolve the residue (yellow gum) in 10 parts by volume of benzene, wash the obtained solution with water before adding same to a solution of 0.020 part of p-toluenesulfonic acid in 50 parts by volume of 1:1 acetone/water.

After maintaining for two hours at room temperature, concentrate the resultant admixture in vacuo to 20 parts by volume and then extract same with benzene to obtain a foam. Crystallize the foam from diethyl ether (3 parts by volume)—petroleum ether (20 parts by volume) to obtain the title compound, M.P. (168°)–169° to 172°.

Following the procedure of Example 4(b), but replacing the butynyl bromide with an equivalent of methallyl chloride, results in the preparation, in similar manner, of 17α-methallyl-13β-methyl-B-homogona-1,3,5(10)-triene-3,17β-diol, M.P. 85° to 87° (dec.).

EXAMPLE 5

3-methoxy-13β-methyl-17α-ethynyl-B-homogona-1,3,5-(10),8-tetraen-17β-ol

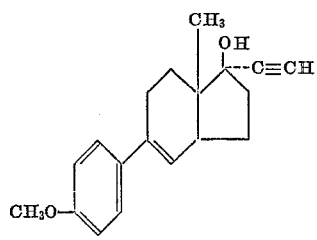

Pass acetylene through a solution of 0.1 part of lithium and 20 parts by volume of ethylene diamine for 1 hour. Then, at room temperature, and over a period of 30 minutes, add to the resultant a tetrahydrofuran (6 parts by volume) solution of 0.2 part of 3-methoxy-13β-methyl-B - homogona - 1,3,5(10),8 - tetraen-17-one. After two hours add thereto 1 part of ammonium chloride and then 100 parts by volume of water. Extract the thus-prepared mixture with diethyl ether. Wash the ethereal extract with 2% hydrochloric acid and then with water; dry and evaporate the resultant to obtain the title compound; M.P., after crystallization from methanol-petroleum ether: 139° to 141°.

EXAMPLE 6

(a) 3-methoxy-13β-methyl-B-homogona-1,3,5(10),8(14)-tetraen-17β-ol

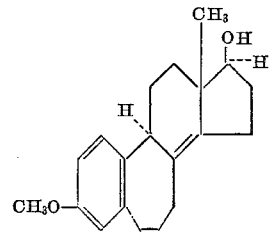

To a mixture consisting of 2300 parts by volume of distilled liquid ammonia, 452 parts by volume of aniline, 820 parts by volume of tetrahydrofuran and 34.8 parts of 3-methoxy-13β-methyl - B - homogona - 1,3,5(10),8,14-pentaen-17β-ol, within 30 minutes, 8.9 parts of lithium metal. After 5 hours at refluxing ammonia temperature, add 8.7 parts of ammonium chloride and allow the ammonia to escape. Work up the mixture with diethyl ether-benzene 1:1, remove the aniline by subsequent washings with 2 N hydrochloric acid. Evaporate to dryness the washed and dried ether-benzene solution and dissolve the residue (35 parts) in a mixture of 175 parts by volume of acetic anhydride and 525 parts by volume of dry pyridine. After overnight at room temperature, pour the mixture on ice (300 parts); filter the crude acetate of the title product, which separates crystalline, M.P. 89° to 94°, and wash same with methanol. Stir the acetate with a mixture of 1350 parts by volume of methanol and 550 parts by volume of 5% sodium hydroxide solution at room temperature for 18 hours, filter and wash with water to obtain the title product, M.P. 96° to 99°, M.P. of the (pure) acetate 91° to 93.5°.

(b) 3-methoxy-13β-methyl-B-homogona-1,3,5(10),8(14)-tetraen-17-one

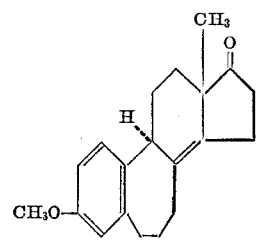

To a solution of 3.0 parts of (a) in 120 parts by volume of acetone, add 3.6 parts by volume of 8 N chromic acid solution. The temperature rises from 25° to 36° within 5 minutes. Add 12 parts by volume of isopropyl alcohol and 6.0 parts of sodium hydrocarbonate, filter the mixture and thoroughly wash the solids with warm chloroform. Evaporate the combined filtrates and washings to dryness and dissolve the residue in benzene (25 parts by volume); then pass same through a column of alumina. Evaporate the eluates and crystallize with petroleum ether to give the title product, M.P. 98° to 100°. 3-methoxy-13β-ethyl-B-homogona-1,3,5(10),8(14)-tetraen - 17 - one, M.P. (71°) 74° to 75°, is analogously prepared.

(c) 13β-methyl-B-homogona-1,3,5(10),8(14)-tetraene-3,17β-diol

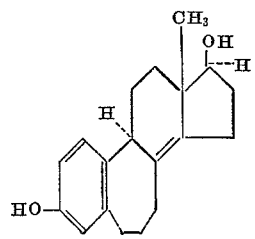

To a Grignard mixture prepared from 0.073 part of magnesium metal and 0.426 part of methyl iodide in 10 parts by volume of diethylether, add a solution of 0.142 part of (a) in diethylether. Distill off the ether and maintain the residue (protected by a nitrogen atmosphere) at 160° for 45 minutes. Cool the resultant to room temperature by adding ice and water thereto. Then acidify to pH 1 with 6 N hydrochloric acid. The title compound, M.P. 98° to 120° (foaming), precipitates and is isolated by filtration.

(d) 3-hydroxy-13β-methyl-B-homogona-1,3,5(10),8(14)-tetraen-17-one

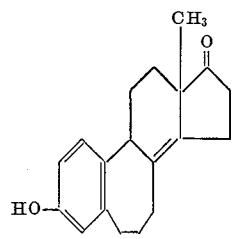

Following the procedure of Example 3(f), but replacing compound 3(e) with 2.87 parts of 6(c), results in the preparation of the title compound, M.P. 198° to 208° (dec.)

(e) 17α-methallyl-13β-methyl-B-homogona-1,3,5(10),8(14)-tetraene-3,17β-diol

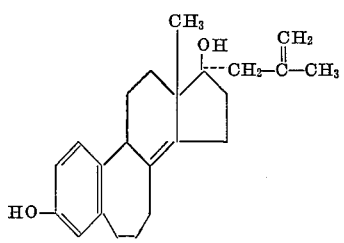

Following the procedure of Example 4(b), but replacing compound 4(a) with an equivalent of compound 6(d) and replacing the butynyl bromide with an equivalent of methallyl chloride, results in the preparation, in similar manner, of the title compound, which remains as a foam. The foam is characterized by the NMR spectrum of its 3-acetate derivative: C-methyl peaks at 69.0, 101 to 101.5 and 136 c.p.s. (60 mc., $CDCl_3$).

EXAMPLE 7

3-methoxy-13β-methyl-17α-ethyl-B-homogona-1,3,5(10),8(14)-tetraen-17β-ol

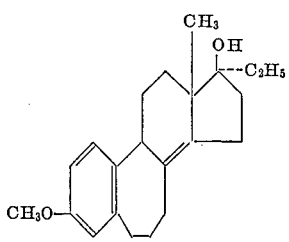

Add, to a Grignard mixture prepared from 1.23 parts of magnesium metal and 5.95 parts of ethyl bromide in 10 parts by volume of diethyl ether, 3.0 parts of 3-methoxy-13β - methyl - B - homogona - 1,3,5(10),8(14) - tetraen-17-one dissolved in 75 parts by volume of xylene. Distill off the ether and reflux the mixture for 18 hours. After cooling, add saturated (aq) ammonium chloride solution and extract product with chloroform. M.P., after recrystallization from isopropyl alcohol, 127°.

EXAMPLE 8

3-methoxy-13β-methyl-17α-allyl-B-homogona-1,3,5(10),8(14)-tetraen-17β-ol

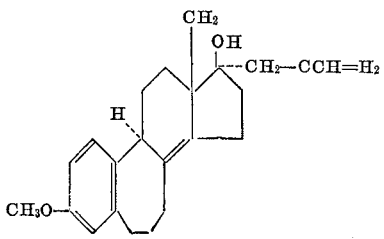

To a Grignard mixture (perpared in the usual way from 2.91 parts by volume of allyl bromide, 0.740 part of magnesium and 50 parts by volume of diethyl ether) add a solution of 1.2 parts of 3-methoxy-13-methyl-B-homogona-1,3,5(10),8(14)-tetraen-17-one in 10 parts by volume of benzene-diethyl ether (1:1). After 30 minutes, add 60 parts by volume of xylene to the resultant and raise the temperature of the mixture, within 5 hours, to 120° while allowing the lower-boiling solvents to distill off. After cooling to room temperature, add 120 parts by volume of saturated ammonium chloride solution and wash the organic layer with subsequent portions of water. Dry over sodium sulfate and evaporate off the dried solution to obtain a red gum. Chromatograph the red gum on a silica gel column to obtain the title compound which, after crystallization from isopropyl alcohol, as the M.P. of 134° to 136°.

EXAMPLE 9

(a) 3-methoxy-13β-methyl-B-homogona-2,5(10),8(14)-trien-17β-ol

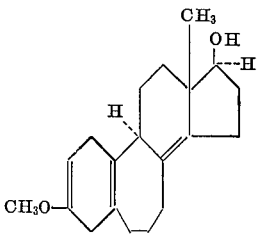

To a mixture of 175 parts by volume of liquid amonia, 45 parts by volume of tert.-butanol, 450 parts by volume of tetrahydrofuran and 5.0 parts of 3-methoxy-13β-methyl-B-homogona-1,3,5(10),8(14)-tetraen-17β-ol, add 0.90 part of lithium. After 1 hour at refluxing ammonia temperature, add an additional quantity of 0.45 part of lithium. After 4 hours at the same temperature add 50 parts by volume of methanol and evaporate the ammonia by the aid of a water aspirator. Thereafter add 300 parts by volume of water and then wash the mixture with water before concentrating in vacuo until crystallization of the product starts. Filter and dry over phosphorus pentoxide to obtain the title product, M.P. 83° to 92°.

(b) 17β-hydroxy-13β-methyl-B-homogona-5(10),8(14)-dien-3-one

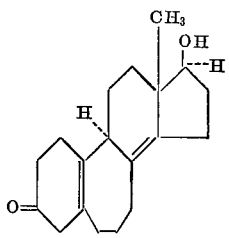

Stir a mixture of 2.8 parts of 3-methoxy-13β-methyl-B-homogona-2,5(10),8(14)-trien-17β-ol in 50 parts by volume of acetic acid and 10 parts by volume of water at room temperature. After 25 minutes extract the mixture with chloroform. Wash the chloroform solution with sodium hydrocarbonate solution and water; then dry same over sodium sulfate and evaporate to obtain the title product. Crystallize the title compound from petroleum ether.

(c) 17β-hydroxy-13β-methyl-B-homogona-4,8(14), 9-trien-3-one

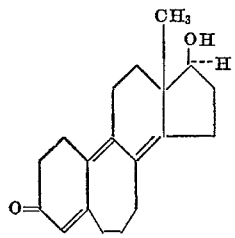

Treat a solution of 0.3 part of 17β-hydroxy-13β-methyl-B-homogona-5(10),8(14)-dien-3-one in 40 parts by volume of pyridine at 5° with 3.5 parts of pyridinium bromide perbromide. After 5 minutes dilute the mixture with water and filter the resulting precipitate. Then wash the precipitate with water. Dissolve the thus-obtained crude dibromide in 200 parts by volume of pyridine and allow the resulting solution to stand at room temperature for 2 hours. Then concentrate the mixture to about 10 parts by volume in vacuo, dilute the concentrate with water and obtain the crude title product by extracting the resulting mixture with methylene chloride, drying the extract and evaporating the methylene chloride solution therefrom. Crystallize the title compound from diethyl ether.

(d) 13β-methyl-B-homogona-4,8(14),9-trien-3-17-dione

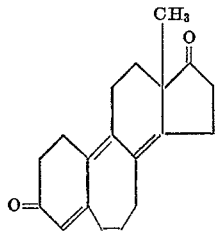

Add to a stirred mixture of 30 parts of 17β-hydroxy-13β-methyl-B-homogona-4,8(14),9 - trien-3-one and 60 parts of anhydrous magnesium sulfate in 1500 parts by volume of actone, 36 parts by volume "Jones Reagent" (8 N chromic acid-sulfuric acid). After 5 minutes add 90 parts by volume of isopropyl alcohol, followed by 60 parts of sodium hydrocarbonate. Evaporate the acetone and distribute the residue between chloroform and water. Evaporate the dried chloroform solution and crystallize the residue to obtain the title compound.

EXAMPLE 10

(a) 17α-ethyl-3-methoxy-13β-methyl-B-homogona-2,5(10),8(14)-trien-17β-ol

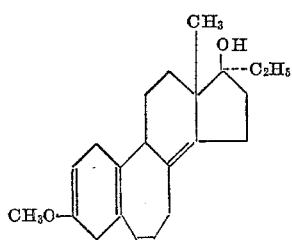

Add, at —60°, 4 parts of lithium to a solution of 1.10 part of 3-methoxy-17α-ethyl-13β-methyl-B-homogona-1,3,5(10),8(14)-tetraen-17β-ol, 200 parts by volume of tetrahydrofuran (THF) and 400 parts by volume of liquid ammonia. After stirring the resultant for 30 minutes, add 50 parts by volume of ethanol dropwise thereto. Allow the ammonia to evaporate from the mixture. Then add water thereto to precipitate the title compound. Filter the precipitate and recrcystallize same to obtain purified title compound.

(b) 17α-ethyl-17β-hydroxy-13β-methyl-B-homogona-4,8(14)-dien-3-one

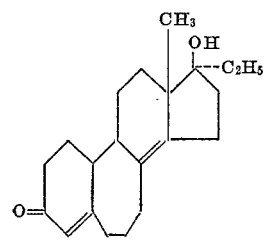

Add dropwise 15 parts by volume of 6 N hydrochloric acid to a solution of 0.8 part of (a) in 40 parts by volume of 1:1 THF/methanol. After maintaining the resultant for 60 minutes at room temperature, dilute same with water and extract through chloroform to obtain the title compound.

EXAMPLE 11

(a) 3-methoxy-13β-methyl-B-homogona-2,5(10)-dien-17β-ol

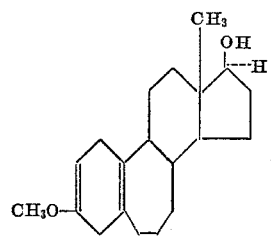

Add 13 parts of lithium to a solution of 22.3 parts of 3-methoxy-13β-methyl-B-homogona-1,3,5(10) - trien-17β-ol, 700 parts by volume of liquid ammonia and 450 parts by volume of THF. Treat the resultant dropwise with 145 parts by volume of ethanol. Evaporate the ammonia and then add ethyl acetate to the remainder. Wash and dry the ethyl acetate layer before evaporating same to dryness. Recrystallize the residue to obtain the title compound.

(b) 3-methoxy-13β-methyl-B-homogona-2,5(10)-dien-17-one

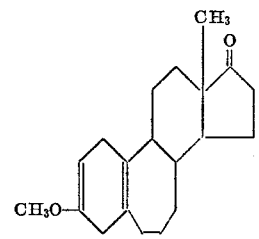

Reflux for 3 hours under nitrogen a mixture of 15 parts of 3-methoxy-13β-methyl-B-homogona-2,5(10)-dien-17β-ol, 500 parts by volume of toluene, 140 parts by volume of cyclohexanone and 7 parts of aluminum isopropoxide. Cool the refluxed material to room temperature, and then add thereto 20 parts by volume of water followed by 30 parts of sodium sulfate. Filter the thus-obtained mixture and concentrate the filtrate to obtain the title compound as a solid.

(c) 17α-ethynyl-17β-hydroxy-13β-methyl-β-homogon-5(10)-en-3-one

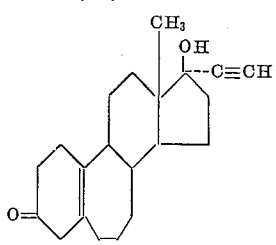

Add (in one portion) 12.2 parts of lithium-acetylide-ethylene-diamine complex to a solution of 18.6 parts of 3 - methoxy - 13β - methyl - B - homogona - 2,5(10)-dien-17-one in 600 parts by volume of dimethyl acetamide. Pass acetylene for 2 hours (with continuous stirring) through the resulting solution. Then add 1000 parts by volume of ice water to the resultant and extract the obtained mixture with benzene. Evaporate the benzene extract to obtain 17α-ethynyl-3-methoxy-13β-methyl-B-homogona-2,5(10)-dien-17β-ol. Reflux the latter with a mixture of 50 parts of oxalic acid and 1000 parts by volume of 4:1 methanol/water to obtain the title compound.

EXAMPLE 12

17α-ethynyl-17β-hydroxy-13β-methyl-β-homogon-4-en-3-one

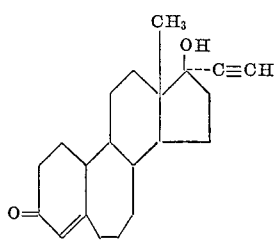

Stir at room temperature for 3 hours a mixture of 28.3 parts of 17α - ethynyl - 3 - methoxy - 13β - methyl - B-homogona-2,5(10)-dien-17β-ol, 500 parts of methanol and 34 parts by volume of 11 N hydrochloric acid. Then dilute the resultant with brine before extracting same with chloroform. Wash and dry the chloroform solution and evaporate same to obtain the title compound.

EXAMPLE 13

(a) 17β-hydroxy-13β-methyl-B-homogon-4-en-3-one

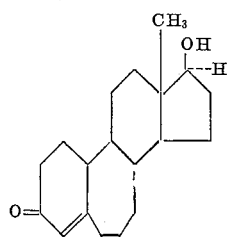

Stir for four hours at refluxing ammonia temperature a mixture of 5.4 parts of 3-methoxy-13-methyl-B-homogona-1,3,5(10)-trien-17β-ol, 50 parts by volume of tetrahydrofuran, 200 parts by volume of liquid ammonia, 50 parts by volume of tert.-butyl alcohol and 1 part of lithium metal. Add to the resultant 50 parts by volume of methanol and then allow the ammonia to evaporate. Thereafter add thereto 200 parts by volume of water prior to concentration in vacuo, whereupon the intermediary, 3 - methoxy - 13β-methyl-B-homogona-2,5(10)-dien-17β-ol, separates as an amorphous solid. Filter, wash thoroughly with water and dry said amorphous solid. Stir the thus-dried solid for 2.5 hours at room temperature with a mixture of 80 parts by volume of methanol, 8 parts by volume of water and 5 parts by volume of concentrated hydrochloric acid. Thereafter dilute the resultant with 80 parts by volume of water to separate the title compound as a solid. Purify the thus-obtained title compound by recrystallization from, e.g., diethyl ether-petroleum ether (9:1).

(b) 13β-methyl-17β-propionyloxy-B-homogon-4-en-3-one

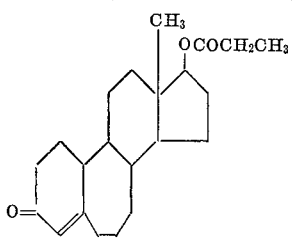

Admix 0.08 part of propionic acid anhydride with a solution of 0.2 part of 13β - methyl - 17β - hydroxy - B-homogon-4-en-3-one and 3-parts by volume of pyridine. Retain the resultant 4 hours at room temperature. Then pour the resulting mixture on ice water. Extract the resultant with chloroform to obtain the oily title compound.

EXAMPLE 14

13β,17α-diethyl-17β-hydroxy-B-homogona-4,9-dien-3-one

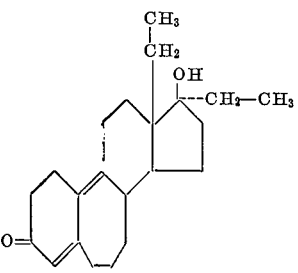

Following the procedure of Example 2(a), replace the 2-methylcyclopentane-1,3-dione with an equivalent of 2-ethylcyclopentane-1,3-dione to obtain the corresponding 13 - ethyl - 3-methoxy-8,14-seco-B-homogona-1,3,5(10), 9(11)-tetraene-14, 17-dione.

Following the procedure of Example 2(b), replace the title compound of Example 2(a) with an equivalent of the thus-obtained 13-ethyl-3-methoxy-8,14-seco-B-homogona-1,3,5(10),9(11)-tetraene14,17-dione to obtain 13β-ethyl-3 - methoxy - B-homogona-1,3,5(10),8,14-pentaen-17-one, M.P. (89°) 91° to 92° (after recrystallization from methanol).

Following the procedure of Example 3(a), replace the title compound of Example 2(b) with an equivalent of 13β - ethyl - 3 - methoxy - B-homogona-1,3,5(10),8,14-pentaen - 17 - one to obtain 13β - ethyl - 3 - methoxy-B-homogona-1,3,5(10),8,14-pentaen-17β-ol.

Admix 0.07 part of acetic acid anhydride with a solution of 0.2 part of 13b-ethyl-3-methoxy-B-homogona-1,3,5-(10),8,14-pentaen-17β-ol and 3 parts by volume of pyridine. Retain the resultant at room temperature for four hours. Then pour the resulting mixture on ice water. Extract the resultant with chloroform to obtain the corresponding 17β-acetate, M.P. 142° to 143°.

Following the procedure of Example 3(b), replace the title compound of Example 3(a) with an equivalent of 13β - ethyl - 3 - methoxy - B - homogona-1,3,5(10),8,14-pentaen-17β-ol to obtain 13β-ethyl-3-methoxy-B-homogona-1,3,5(10),8-tetraen-17β-ol.

Following the procedure of Example 3(c), replace the title compound of Example 3(b) with an equivalent of 13β - ethyl - 3-methoxy-B-homogona-1,3,5(10),8-tetraen-17β - ol to obtain 13β - ethyl - 3 - methoxy-B-homogona-1,3,5(10)-trien-17β ol.

Following the procedure of Example 6(b), replace the title compound of Example 6(a) with an equivalent of 13β - ethyl - 3 - methoxy - B - homogona-1,3,5(10)-trien-17β - ol to obtain 13β - ethyl - 3 - methoxy-B-homogona-1,3,5(10)-trien-17-one.

Add 3.0 parts of 13β-ethyl-3-methoxy-B-homogona-1,3,5(10)-trien-17-one dissolved in 75 parts by volume of xylene to a Grignard mixture prepared from 1.23 parts of magnesium metal and 5.95 parts of ethyl bromide in 10 parts by volume of diethylether. Distill off the ether, and reflux the remainder for eighteen hours. After cooling the refluxed remainder to room temperature, add saturated (aq) ammonium chloride solution thereto, and extract the resultant with chloroform to obtain 13β-17α-diethyl-3-methoxy-B-homogona-1,3,5(10)-trien-17β-ol.

Following the procdeure of Example 9(a), replace the title compound of Example 6(a) with an equivalent of 13β,17α - diethyl - 3 - methoxy - B-homogona-1,3,5(10)-trien - 17β - ol to obtain 13β,17α - diethyl-3-methoxy-B-homogona-2,5(10)-dien-17β-ol.

Following the procedure of Example 9(b), replace the title compound of Example 9(a) with an equivalent of 13β,17α - diethyl - 3-methoxy-B-homogona-2,5(10)-dien-17β - ol to obtain 13β,17α - diethyl - 17β - hydroxy - B-homogon-5(10)-en-3-one.

Add 0.7 part of pyridinium bromide perbromide to a solution of 0.58 part of 13β,17α-diethyl-17β-hydroxy-B-homogon-5(10)-en-3-one in 8 parts by volume of pyridine at 7°. Pyridine hydrobromide precipitates. When the precipitation is considered to be complete, add thereto 25 parts by volume of water. Separate by filtration the resulting precipitate (consisting of an intermediary di-bromo compound). Wash the latter precipitate with water and then with small amounts of ice-cold ethyl acetate. Redissolve the thus-washed precipitate in 40 parts by volume of pyridine, and maintain the resulting solution at 30° for 2 hours. Add 100 parts by volume of water to the resultant and then extract same with chloroform. Evaporate the dried chloroform solution (extract) to obtain a foam. Admix the form with diethyl ether to obtain the title compound as a colorless solid.

EXAMPLE 15

17α-chloroethynyl-13β-ethyl-17β-hydroxy-B-homogona-4,8(14),9-trien-3-one

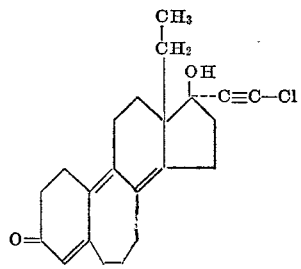

Following the procedure of Example 6(a), replace the 3 - methoxy - 13β - methyl-B-homogona-1,3,5(10),8,14-pentaen-17β-ol with an equivalent of 13β-ethyl-3-methoxy-B-homogona-1,3,5(10),8,14-pentaen-17β-ol (see Example 14) to obtain 13β-ethyl-3-methoxy-B-homogona-1,3,5(10),8(14)-tetraen-17β-ol, M.P. (65°)–67° to 68°, acetate M.P. (103°)105° to 106°.

Following the procedure of Example 9(a), replace the title compound of Example 6(a) with an equivalent of 13β - ethyl - 3 - methoxy-B-homogona-1,3,5(10),8(14)-tetraen - 17β - ol to obtain 13β - ethyl - 3 - methoxy - B-homogona-2,5(10),8(14)-trien-17β-ol.

Following the procedure of Example 9(b), replace the title compound of Example 9(a) with an equivalent of 13β-ethyl-3-methoxy-B-homogona - 2,5(10),8(14)-trien-17β-ol to obtain 13β-ethyl - 17β - hydroxy-B-homogona-5(10),8(14)-diene-3-one.

Following the procedure of Example 9(c), replace the title compound of Example 9(b) with an equivalent of 13β-ethyl-17β-hydroxy-B-homogona - 5(10),8(14)-dien-3-one to obtain 13β-ethyl - 17β - hydroxy-B-homogona-4,8(14),9-trien-3-one.

Following the procedure of Example 9(d), replace the title compound of Example 9(c) with an equivalent of 13β-ethyl-17β-hydroxy-B-homogona - 4,8(14),9-trien-3-one to obtain 13β-ethyl-B-homogona - 4,8(14),9-triene-3,17-dione.

Add, at —60°, a solution of 0.7 part of trans-1,2-dichloroethylene in 2.0 parts by volume of diethyl ether to a sodamide mixture prepared from 0.3 part of sodium and 20 parts of liquid ammonia. Maintain the resulting admixture at the reflux temperature of ammonia and add thereto a solution of 2.9 parts of 13β-ethyl-B-homogona-4,8(14),9-triene-3,17-dione and 15 parts by volume of THF.

After 90 minutes, at —30° pour the resultant into a mixture of ammonium chloride and ice, extract with diethyl ether, wash the ethereal extracts with dilute hydrochloric acid, aqueous sodium hydrocarbonate and water and dry over sodium sulfate. Chromatograph in an acid-washed alumina to obtain the title compound.

What is claimed is:

1. A B-(6)-homogonene of the formula

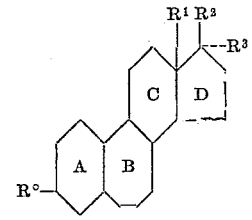

wherein

R⁰ is a member selected from the group consisting of hydroxy and alkanoyloxy having from 2 to 4 atoms;

R¹ is a member selected from the group consisting of methyl, ethyl, propyl and isopropyl;

R² is a member selected from the group consisting of hydroxy and alkanoyloxy having from 2 to 20 carbon atoms;

R³ is a member selected from the group consisting of a hydrogen atom, lower alkyl, lower alkenyl, lower alkynyl, chlorethynyl and fluorethynyl;

any hydrogen bound to a member of the group consisting of $C_9$, $C_{14}$ and $C_{17}$ is in the α-position, any hydrogen bound to $C_8$ is in the β-position and any double bonds in the A, B, C and D rings are selected from the group consisting of $\Delta^{1,3,5(10)}$, $\Delta^{1,3,5(10),8}$, $\Delta^{1,3,5(10),8,14}$ and $\Delta^{1,3,5(10),8(14)}$.

2. A compound of claim 1 wherein R⁰ is a member selected from the group consisting of hydroxy and acetoxy; R¹ is a member selected from the group consisting of methyl and ethyl; R² is hydroxy; and R³ is a member selected from the group consisting of allyl and 2-butyn-1-yl and having unsaturation selected from the group consisting of $\Delta^{1,3,5(10)}$ and $\Delta^{1,3,5(10),8(14)}$.

3. The compound of claim 2 which is 17α-allyl-13β-ethyl-B-homogona-1,3,5(10)-triene-3,17β-diol.

4. A compound of claim 1 wherein each of R⁰ and R² is hydroxy.

5. The compound according to claim 2 which is 17α-allyl-13β-ethyl-B-homogona - 1,3,5(10),8(14) - tetraene-3,17β-diol.

6. The compound according to claim 2 which is 17α-(2-butyn-1-yl)-13β-methyl-B-homogona - 1,3,5(10)-triene-3,17β-diol.

7. The compound according to claim 2 which is 17α-(2-butyn-1-yl)-13β-methyl-B-homogona - 1,3,5(10),8(14)-tetraene-3,17β-diol.

8. The compound according to claim 2 which is 3-acetoxy-17α-allyl-13β-ethyl-B-homogona - 1,3,5(10)-trien-17β-ol.

9. The compound according to claim 2 which is 3-acetoxy-17α-allyl-13β - ethyl-B-homogona - 1,3,5(10),8(14)-tetraen-17β-ol.

10. The compound according to claim 2 which is 3- acetoxy-17α-(2-butyn-1-yl) - 13β - methyl-B-homogona-1,3,5(10)-trien-17β-ol.

11. The compound according to claim 2 which is 3-acetoxy-17α-(2-butyn-1-yl) - 13β - methyl-B-homogona-1,3,5(10),8(14)-tetraen-17β-ol.

12. The compound according to claim 4 which is 13β-methyl-B-homogona-1,3,5(10),8-tetraene-3,17β-diol.

13. The compound according to claim 4 which is 17α-(2-butyn-1-yl)-13β-methyl - B - homogona-1,3,5(10),8-tetraene-3,17β-diol.

14. The compound according to claim 4 which is 17α-methallyl-13β-methyl-B - homogona-1,3,5(10),8-tetraene-3,17β-diol.

15. The compound according to claim 4 which is 13β-methyl-B-homogona-1,3,5(10),8(14)-tetraene-3,17β-diol.

16. The compound according to claim 4 which is 17α-methallyl-13β-methyl - B - homogona - 1,3,5(10),8(14)-tetraene-3,17β-diol.

17. The compound according to claim 4 which is 17α-methallyl-13β-methyl - B - homogona - 1,3,5,(10)-triene-3,17β-diol.

References Cited

UNITED STATES PATENTS 3,291,836  12/1966  Tadanier et al.

OTHER REFERENCES

Ringold—J. Am. Chem. Soc. vol. 82, pp. 961–963 (1960).

Knox et al.—J. Org. Chem. vol. 30, pp. 4160–4165 (1965).

Himizu et al.—Chem. Pharm. Bull. 13 (9) pp. 1145–1147 (1965).

Tomko et al.—Tetrahedron Letters No. 9 pp. 915–919 (1966).

Tadanier—J. Org. Chem. vol. 31, pp. 3204–3206 (1966).

JAMES A. PATTEN, Primary Examiner

U.S. Cl. X.R.

260—619, 345.9, 410.5, 488, 590, 613, 611, 410, 586; 424—339, 346, 343, 311, 312, 331, 341